Sept. 3, 1957　　　R. W. WINBERG　　　2,804,621
CLIP-FORMING AND CLINCHING MECHANISMS
Filed Feb. 17, 1955　　　5 Sheets-Sheet 1

INVENTOR.
RAGNAR W. WINBERG
BY
Morton Amster
ATTORNEY

Sept. 3, 1957   R. W. WINBERG   2,804,621
CLIP-FORMING AND CLINCHING MECHANISMS
Filed Feb. 17, 1955   5 Sheets-Sheet 2

INVENTOR.
RAGNAR W. WINBERG
BY
ATTORNEY

INVENTOR.
RAGNAR W. WINBERG
BY
ATTORNEY

Sept. 3, 1957 R. W. WINBERG 2,804,621
CLIP-FORMING AND CLINCHING MECHANISMS
Filed Feb. 17, 1955 5 Sheets—Sheet 5

INVENTOR.
RAGNAR W. WINBERG
BY
ATTORNEY

United States Patent Office 2,804,621
Patented Sept. 3, 1957

2,804,621

CLIP-FORMING AND CLINCHING MECHANISMS

Ragnar W. Winberg, Floral Park, N. Y., assignor to O and W Sewing Machine Attachments, Inc., Mineola, N. Y., a corporation of New York Application February 17, 1955, Serial No. 488,813

16 Claims. (Cl. 1—177)

The present invention relates to forming and assembling apparatus, and particularly to a machine for forming spring clips from a strip of metal and for clinching the metal clips on an article, such as the inturned ends of a covered wire buckle.

In the manufacture of covered wire buckles, it is conventional to form a length of wire stock covered with leather, plastic, cloth or the like, into a generally rectangular shape or frame with terminal or end portions of the wire stock bent into end to end alignment. Thereafter, the aligned end portions of the buckle body are joined together by a metal clip which is clinched about the aligned end portions. The finishing operation usually is achieved by employing a more or less conventional foot or kick press in conjunction with machine-formed clips. This type of finishing operation necessitates manual feed of successive clips to the press along with the buckle body, followed by operation of the press. Obviously, this manner of finishing is tedious and time-consuming, especially when it is recalled that covered wire buckles are usually manufactured in very large quantities and at comparatively low unit cost.

In lieu of such tedious and time-consuming finishing operation, mechanisms have been devised for automatically feeding clips of a special construction from a hopper to a clinching punch or press at which the specially-formed clip is clinched about the inturned ends of the buckle body. Although such machine represents an advance over the prevalent finishing methods, the machine is limited in its application in that it requires clips of special construction. Apart from the increase in cost represented by employing such special clips, the need for such special clips limits the manufacturer's source of supply.

Investigation indicates that clips of especially simple configuration, as have been employed for many years, are suitable for clinching the inturned ends of the buckle body. Such clips are of generally U-shaped configuration and define a guideway into which the inturned ends of the buckle may be slipped. The U-shaped clip terminates at its opposite sides in serrated edges which, when turned inwardly during the clinching operation, serve as teeth and grasp the buckle covering. Practical considerations indicate that such clips should be both formed and clinched by the belt manufacturer. That is, from the viewpoint of economy, simplicity and availability, both the clip manufacturing and clip clinching operation should be achieved in the same machine, preferably starting from readily available metallic stock.

It is broadly known to provide a single machine which forms clips or ferrules and to apply such clips to cylindrical members; however, such machines in their broad application to the manufacture of covered wire buckles must take into account many practical considerations. Simplicity and reliability are prime requisites in gaining commercial acceptance by buckle manufacturers for a combined clip-forming and clinching machine; even the most simple mechanical difficulties which might be encountered in other types of automatic machinery are a deterrent to use of such a machine by a buckle manufacturer, especially when it is recalled that cost considerations dictate the use of unskilled labor in operating such machines. Apart from the labor requirements, such clip-forming and clinching machines are usually placed in relatively small manufacturing operations having no facilities for minor adjustments or servicing. Usually the most simple repair or adjustment necessitates the services of an outside mechanic.

It is broadly an object of the present invention to provide a clip-forming and clinching machine obviating one or more of the aforesaid difficulties. Specifically, it is within the contemplation of the present invention to provide mechanisms which form lengths of metal stock into clips and transfer successive clips to further mechanisms for clinching the clips about an article, such as the inturned ends of a covered wire buckle.

It is a still further object of the present invention to provide clip-forming and clinching mechanisms suitable for use in the manufacture of covered wire buckles and which may be operated by highly unskilled personnel.

It is a still further object of the present invention to provide forming and clinching apparatus of the aforesaid character which assure virtually trouble-free operation, and in the event of fouling, may be cleared of the trouble without requiring dismantling of parts, or servicing by a skilled repairman.

It is a still further object of the present invention to provide clip-forming and clinching mechanisms which may be operated with minimum risk of injury to the operator, and without extreme dexterity or care on the part of the operator.

A still further problem encountered in the forming or bending of a clip about the inturned ends of covered wire buckles is that of handling covered wires of different gauges and/or coverings of different thicknesses and materials. When changing over from one type of cover wire stock to another type, it is not uncommon to find that the clinching punch or die exerts excessive pressure on the covered wire stock, causing the covering to be marred, ripped, or otherwise distorted. Under such conditions, it is necessary to change the dies and/or change the length of the stroke. Such need for adjustment represents a loss of time and money, especially if short runs are made of buckles manufactured of various stock thicknesses.

It is among the objects of the present invention to provide clinching or forming mechanisms which are capable of exerting uniform clinching pressure, despite variations in thicknesses of the covered wire stock employed in the buckles being fed to the mechanisms. To advantage, a wide variety of covered wire buckles may be finished by the present mechanisms, with the assurance of self-adjustment of the clinching pressure, and substantially uniformity in clinching pressure from buckle to buckle.

The above objects as well as further advantages and features of the present invention will be best appreciated by reference to the following detailed description of several presently preferred but nonetheless illustrative embodiments of the present invention, when taken in conjunction with the accompanying drawings, wherein.

Figures 1, 2, 3, 4:
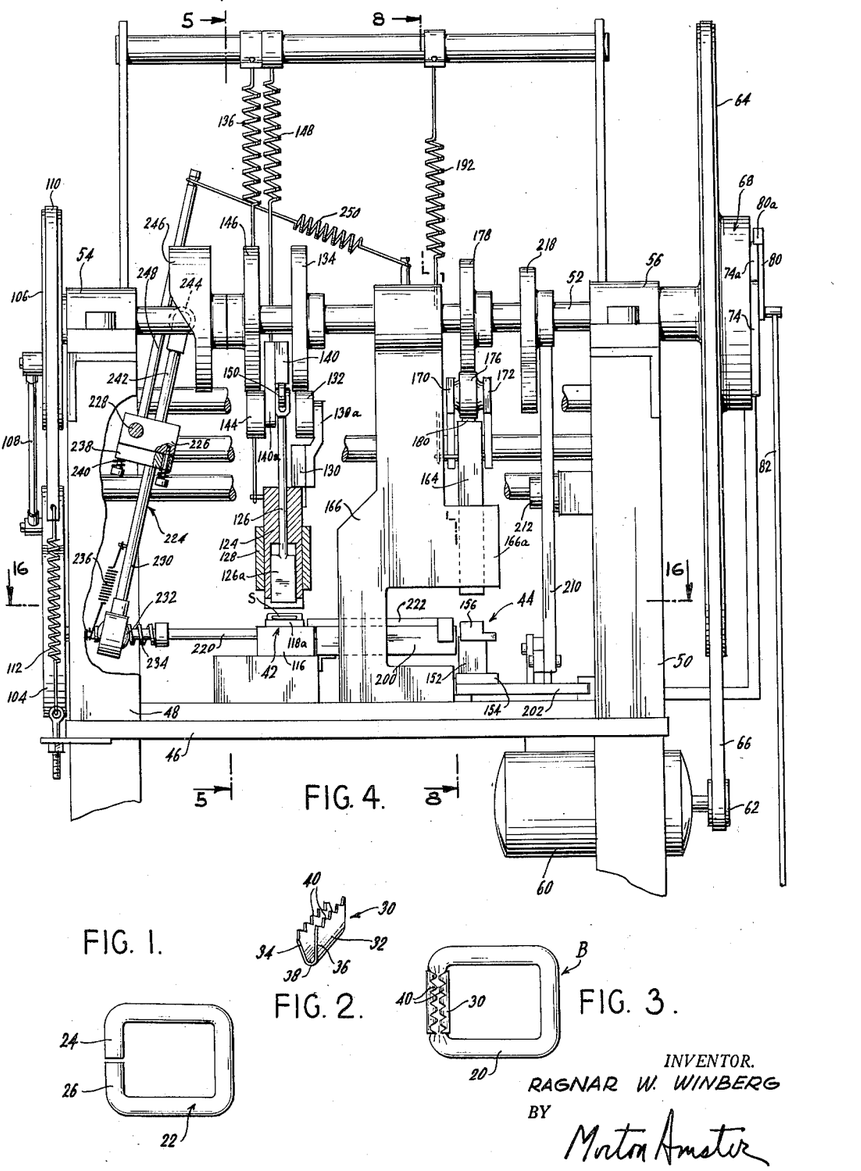
Fig. 1 is a plan view of a partially finished covered wire buckle of the type generally to be processed with apparatus according to the present invention.
Fig. 2 is a perspective view of a typical clip manufactured by a machine embodying features of the present invention.
Fig. 3 is a plan view showing the assembly of the clip of Fig. 2 and the partially finished buckle of Fig. 1 after clinching by mechanism embodying features of the present invention.
Fig. 4 is a side elevational view, with parts broken away and in section, showing an illustrative clip-forming and clinching machine according to the present invention.

Referring now specifically to the drawings, there is shown in Fig. 1 a partially completed covered wire buckle which includes a rectangular body 22 formed from a length of wire stock having thereon an appropriate leather, plastic or cloth cover, the rectangular body having inturned and aligned end portions 24, 26. In Fig. 2 there is shown a spring clip 30 for assembly with the partially completed buckle of Fig. 1, the clip 30 including a generally U-shaped body 32 comprising divergent walls 34, 36 interconnected by a curved bight 38, the walls terminating in serrated edges providing gripping fingers 40. In Fig. 3, there is shown the assembly of the partially complete buckle frame of Fig. 1 and the clip of Fig. 2, the clip 30 encircling the aligned ends 24, 26 of the buckle 22 and being formed such that the teeth 40 are embedded in and grip the covering of the body 22. The mechanisms to be hereinafter described form continuous metal strip stock into open spring clips as shown in Fig. 2, and thereafter upon manual feed of successive buckle frame 22 (Fig. 1) to the machine, is effective to clinch the open spring clip of Fig. 2 into the closed position illustrated in Fig. 3 to form the completed buckle B.

Referring specifically to Fig. 4, there is shown an illustrative machine according to the present invention which includes a clip-forming station 42, and a clip clinching station 44. Generally, the machine includes a frame 46 having spaced upright standards 48, 50 and other frame portions, the details of which are seen in Figs. 5, 8, 13 and 14. Disposed horizontally between the upright standards 48, 50 and traversing both the clip-forming station 42 and the clip-clinching station 44, is a main cam shaft 52, which is journaled for rotation in bearings 54, 56 on the respective standards 48, 50. The main cam shaft 52 is driven from an appropriate electrical motor 60, mounted beneath the frame 46 via a speed reduction coupling. The coupling includes a small diameter pulley 62 connected to the motor shaft, a large diameter pulley 64 loosely journaled on the cam shaft 52, and a V-belt 66 trained about the pulleys. The coupling between the pulley 64 and the cam shaft 52 includes a single cycle clutching mechanism, generally designated by the numeral 68. As seen best in Fig. 13, the control 68 for driving the shaft 52 through a single cycle includes a driven plate 70 keyed to the control shaft 52 and spring biased coupling wedges 72 normally effective to provide a driving connection between the plate 70 and the pulley 64. Such drive is periodically interrupted through provision of a control plate 74 having pins 76 disposed in operative positions relative to the wedges 72, such that upon rocking motion of the control plate 74 in the direction of the arrows in Fig. 13, the wedges 72 are displaced from the position providing the driving connection. The control plate 74 and associated pins 76 are effective at the ends of a cycle to disrupt the drive, and are controlled from a depressible foot treadle 78 and a pivoted bell crank lever 80 connected to the treadle 78 by a rod 82. The control plate 74 includes an extending arm 74a, while the bell crank 80 includes a catch 80a, the bell crank being biased by the spring 84 to engage the arm 74a at the end of a cycle and rock the control plate 74 in the clockwise direction in an amount sufficient to interrupt the drive. Other mechanisms may be employed for attaining the desired single cycle control over the driven cam shaft 52.

At the clip-forming station 42, a continuous length of strip stock is intermittently fed to a work location, severed and formed with the serrated cutting edges providing the clinching teeth 40, and bent into the generally U-shaped body 32. As seen best in Figs. 4 and 5, the mechanisms at the clip-forming station 42 include a feeder 90 for intermittently advancing the metallic strip stock S toward the location for cutoff and forming. The feeder mechanisms include a roller 92 connected to a driven shaft 94, and a cooperating roller 96 keyed to a stub shaft 98. The assembly of the roller 96 and its shaft are mounted on vertically-movable carriage 100 which is biased by one or more springs 102 to urge the roller 96 toward the roller 92.

Intermittent drive is provided to the feeder 90 from the main cam shaft 52 through a coupling including a silent clutch of the ball or roller type which has its driven plate connected to the shaft 94 of the driven roller 92. The silent clutch 104 is driven in the clockwise direction, as illustrated by the arrow in Fig. 14, during a portion of the control cycle through an eccentric coupling including the eccentric plate 106 secured to the control shaft 52 and the coupling rod 108 between the eccentric 106 and the outer rotor of the silent clutch 104. Trained about the eccentric 106 is a braking band 110 which is biased into contact with the periphery of the eccentric 106 by a spring 112. The spring-biased braking band 110 avoids over running of the control shaft 52 by its driving mechanisms. By adjusting the coupling 108 between the eccentric 106 and the silent clutch 104, the effective length of the strip stock S intermittently fed by the feeder 90 may be adjusted in accordance with operational requirements.

Figure 5:
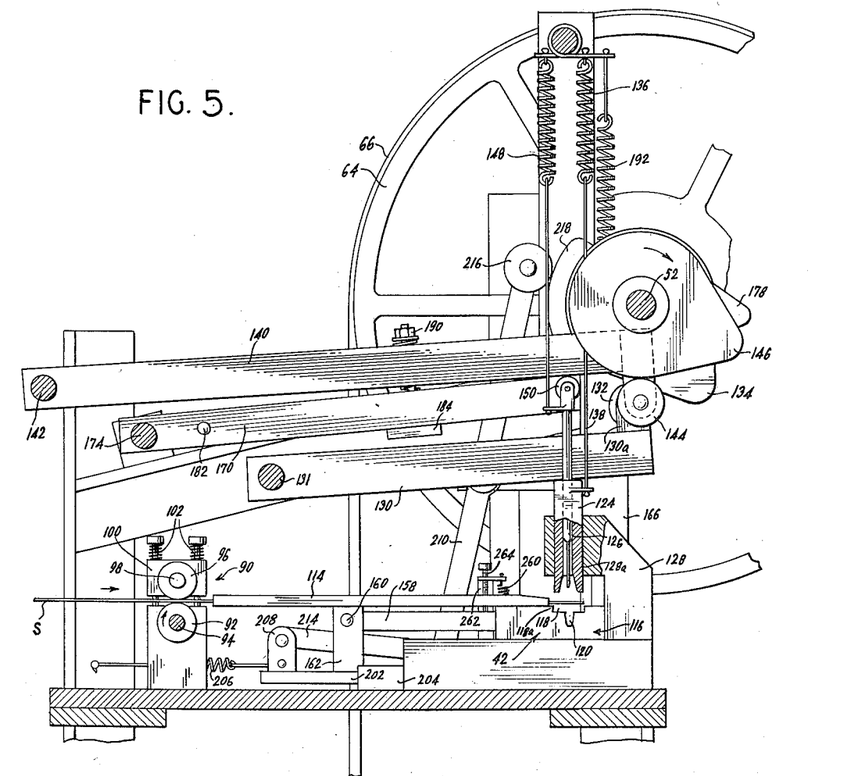
Fig. 5 is an elevational view taken substantially along the lines 5—5 of Fig. 4 in the direction of the arrows, showing the details of the stock feeding and clip-forming mechanisms.
Figure 16:
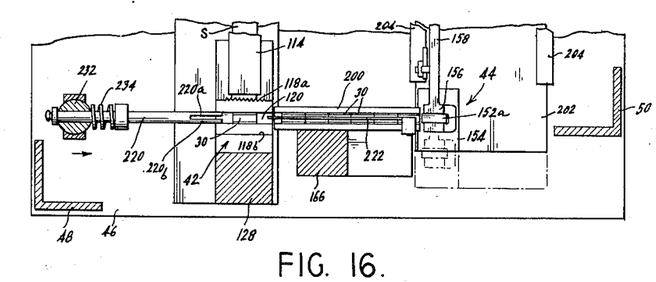
Fig. 16 is a sectional view taken substantially along line 16—16 of Fig. 4 looking in the direction of the arrows, showing the details of the transfer mechanisms intermediate the clip-forming station and the clip-clinching station.

Referring to Fig. 5, it will be seen that the feeder 90 delivers the stock through a guide 114 which extends horizontally and terminates short of a forming die 116 of the clip-forming station 42. The forming die 116 includes a cutoff cavity 118 which is laterally bounded by spaced-apart cutting edges 118a, 118b. The cutting edge 118a is slightly undercut, and as seen best in Fig. 16 is serrated to provide the required clinching teeth 40 for the clips 30 upon cutting of successive blanks of the strip material. The feed of the strip stock S is adjusted in relation to the spacing of the parallel cavity edges 118a, 118b such that the leading edge of the strip, prior to cutting is substantially in the vertical plane of the cutting edge 118b.

Opening upwardly into the bottom of the cutoff cavity 118, is an open-ended shaping cavity 120 of generally U-shaped cross-section and including divergent walls 120a, 120b. The walls 120a, 120b merge into the bottom of the cavity 118 at inwardly projecting ears 122a, 122b, the purpose of which will subsequently become apparent.

Figure 6:
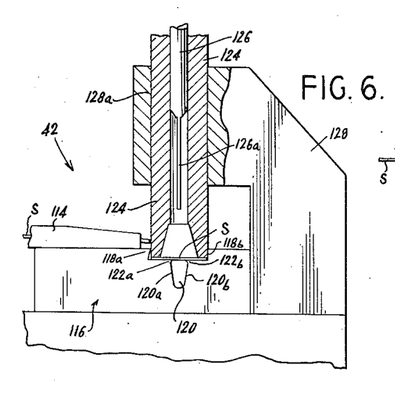
Fig. 6 is a fragmentary elevational view, with parts sectioned, of the clip-forming mechanisms, showing the cutting punch in the extended position and the bending punch in the retracted position.
Figure 7:
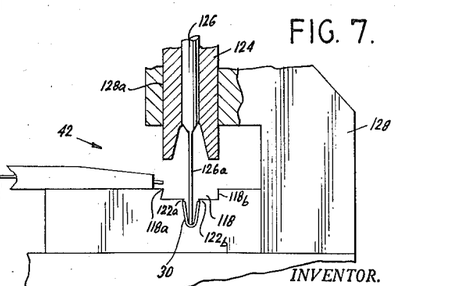
Fig. 7 is an elevational view similar to Fig. 6 but showing the cutting punch in the retracted position and the forming punch in the extended position.

Disposed over the female forming die 116, are nested cutting punch 124 and bending punch 126 each of which is movable through a predetermined vertical stroke. The outer cutting punch 124 is mounted on a bracket 128 having an appropriate bearing guideway 128a and is shaped in relation to the cutoff cavity 118 to sever the leading length of the strip stock S which straddles the cutoff cavity and displace the same downwardly against the bottom of the cavity. The action of the cutting punch 124 may best be appreciated by progressively inspecting Figs. 5 and 6. The nested punch 126 serves as a bending die and is operative in a through guideway provided in the punch 124. The bending punch 126 terminates in a flat blade 126a which extends parallel to th eedges 118a, 118b of the cutoff cavity and is disposed medially of shaping cavity 120. The blade is effective upon being displaced through a predetermined vertical thrust to engage the cutoff blank of strip stock on the floor of the cutoff cavity 118 (as seen in Fig. 6) and to form the blank into the U-shaped configuration of the open clip (see Fig. 2). Upon progressively inspecting Figs. 6 and 7, the function of the bending punch 126 will be best appreciated. It is to be noted that the ears 122a, 122b at the margins of the shaping cavity 120 overlie the formed clip and confine the same against return after the forming operation, which return might be brought about due to springiness of the strip stock.

cent its forward end which carries a cam follower 144. The cam follower 144 rides upon the periphery of a further flat or disc cam 146, the follower 144 being biased into engagement with the cam 146 by a spring 148 and a roller contact 150 bearing against the undersurface of the actuating arm 140 and biasing the follower 144 upwardly and into engagement with the cam 146.

Figures 8, 12:
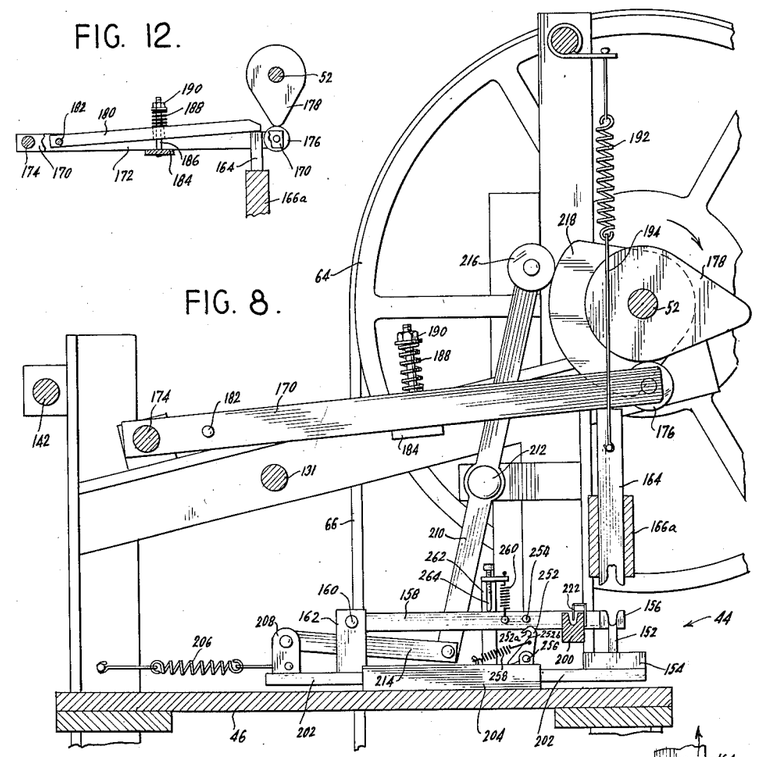
Fig. 8 is an elevational view taken substantially along the line 8—8 of Fig. 4 looking in the direction of the arrows, with parts broken away and sectioned, showing details of the clip transfer and clinching mechanisms.
Fig. 12 is a fragmentary detail of Fig. 6, with parts broken away, showing the construction of a collapsible coupling between the clinching die and its actuating mechanisms.
Figures 9, 10, 11:
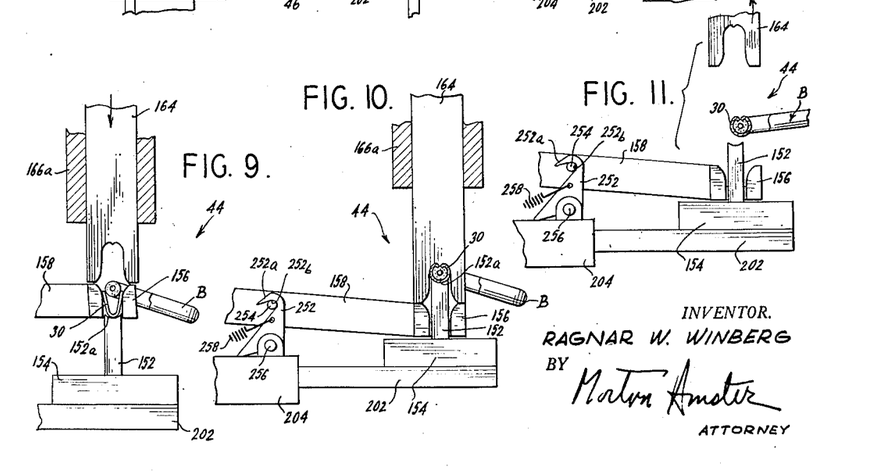
Fig. 9 is a fragmentary elevational view of the clinching mechanisms, with parts sectioned showing the assembly of a clip and buckle in position for clinching.
Fig. 10 is a view similar to Fig. 9 but showing the clip and buckle after the clinching operation and preliminary to withdrawal of the female clinching die.
Fig. 11 is a view similar to Fig. 10 showing the completed clip and buckle and after withdrawal of the female clinching die.

Reference will now be made to Figs. 4 and 8 to 12 inclusive for details of the mechanisms at the clinching station 44 which are effective, upon transfer of successive formed clips thereto and manual feed of partially completed buckles, to clinch the successive clips about the buckles. The mechanisms at the clinching station 44 include an anvil 152 which projects upwardly from a slidable carriage 154 and is formed with a clip supporting surface 152a. Assembled with the anvil 152 is a movable cradle 156 which is secured to a rearwardly extending arm 158 pivoted at 160 on an upstanding bracket 162. The pivotally supported arm 158 mounts the cradle 156 for movement from an extended position (as illustrated in Figs. 8 and 9) wherein the anvil 152 and the cradle 156 cooperate to define a seat substantially complementary to the open clip 30 to a retracted position (as illustrated in Figs. 10 and 11).

Disposed above the assembly of the anvil 152 and the cradle 156 is a female clinching punch 164 which is movable through a predetermined vertical thrust and into a cooperating position with the anvil, as illustrated in Fig. 10. The clinching punch 164 is mounted for vertical reciprocation on a bearing extension 166a of a further upright 166 of the machine frame.

Specially constructed actuating mechanisms are operatively connected to the clinching punch 164 for advancing the same through the required thrust for clinching the clip 30 about the partially-formed buckle frame 22. By progressively inspecting Figs. 9 to 11 inclusive, the cooperation between the punch 164, the anvil 152 and cradle 156 will be seen to include the initial assembly operation while the punch is in the inoperative position (Fig. 8), followed by the punch coming into position to engage the cradle (Fig. 9), followed by the punch displacing the cradle 156 into its retracted position and having its clinching surfaces engaged about the assembly of the clip and inturned ends of the buckle to complete the clinching operation (Fig. 10), and finally by retraction of the punch to permit the completed buckle B to be withdrawn from the forming station (Fig. 11).

The actuating mechanisms for imparting motion to the punch 164 are specially constructed to take into account the handling of covered wire stock in which the tuating member 180 (Fig. 12) which has its leading end engaged over and against the clinching punch 164. The arm 180 is pivoted at its rear end on a pin 182 extending between the arms 170, 172. The actuating arm 180 is biased against the punch 164 through provision of a base plate 184 which is connected beneath and between the arms 170, 172, a pin 186 which projects upwardly through an oversize hole in the arm 180, and a spring 188 which bears against the arm 180 and is supported on the pin 186. The pin 186 is threaded and carries an adjustable nut 190 such that the tension exerted by the spring 188 against the arm 180 may be adjusted. The assembly of the arms 170, 172 and the actuating arm 180 comprises a collapsible linkage which carries the cam follower 176, the assembly of the clinching punch 164 and the collapsible linkage being biased upwardly into engagement with the cam 178 through provision of a spring 192 and a connecting rod 194. Normally, the spring biases the members of the collapsible linkage to provide a driving connection between the actuating mechanisms and the clinching punch 164. This driving connection is effective until the opposing force to movement of the clinching punch exceeds a maximum value. Such maximum value before collapse of the linkage is determined by the biasing effect of the spring 188. Thus, self-compensating action is assured and a desired maximum clinching pressure will not be exceeded despite reasonable thickness variations. A further and separate advantage is realized by the collapsible linkage mechanism in that whenever the clinching punch encounters an excessive opposing force, the machine will continue cycling despite the reaction of the clinching punch to such continued cycling. Thus, even if the clinching punch is fouled at the beginning of the effective clinching stroke, for example at the position of Fig. 9, as by the presence of one or more clips or other interfering matter in the cradle, there is no damage to the machine. Further, after the cycle is completed, the trouble may be located and cleared without the need of a complicated servicing operation.

Referring now specifically to Figs. 4, 8 and 16, the details of the transfer mechanisms for removing successive clips from the forming station 42 and delivering clips to the clinching station 44, will be described. Specifically, a guideway 200 is arranged in end to end alignment with the open-ended shaping cavity 120 at the station 42. Thus, as seen in Fig. 16, the guideway 200 forms an extension of the shaping cavity 120. The guideway 200 defines a transfer path which is spaced rearwardly of the clinching location, that is the position of the anvil 152 and cradle 156 in Figs. 9 to 11 inclusive. As previously described, the assembly of the cradle and anvil is mounted on the carriage 154, which carriage is supported on a track 202 received within a bearing 204 as seen best in Fig. 8. The bearing 204 and track 202 mount the assembly of the anvil 152 and the cradle which is supported on the bracket 160 for movement fore and aft, that is from the retracted position (illustrated by the full lines in Fig. 16) wherein the seating part of the cradle 166 is in alignment with the guideway 200 to the fore position (illustrated by the broken lines) wherein the anvil-cradle assembly is disposed beneath the clinching punch 164. The anvil-cradle assembly is biased into the retracted position by a spring 206 which is secured to an upright bracket 208 on the inward extension of the track 202. The anvil-cradle assembly is positively urged into the fore position by cam actuating mechanisms upon receiving a formed clip from the guideway 200 and during each cycle of operation. The cam operating mechanism includes a connecting lever 210 which is pivoted intermediate its ends at 212. One end of the lever 210 is coupled by the pivoted linkage 214 to the upstanding bracket 208 of the track 202, while the other end of the lever 210 carries a cam follower 216 which rides on a flat disc cam 218.

Successive formed clips are removed from the shaping cavity 120 by a ram rod 220, which has its forward end bifurcated as indicated at 220a, 220b. Suitable mechanisms are operatively connected to the ram 220 for displacing the same through a stroke of a length sufficient to displace the formed clip from the cavity 120 and into the guideway 200. Associated with the guideway 200 is a hold down mechanism in the form of a blade 222 which extends longitudinally of the clips 30. As seen in Fig. 16, the leading end of the hold-down blade 222 extends into the cavity 120, thus cooperating with the bifurcated slotted leading end of the ram 220 in effectuating the transfer of clips to the channelway with positive guiding action.

The mechanisms for imparting the desired stroke to the ram rod 220 include a coupling 224 having a bracket 226 pivoted on a pin 228. Extending from the bracket 226 is an arm 230 which is coupled via a universal joint 232 to the ram rod 220, the assembly of the universal joint with the arm 230 and the ram 222 including springs 234, 236. The arm 230 is carried on a plate 238 which is biased toward the bracket 226 by the springs 240. Thus, a yieldable connection is provided between the pivoted bracket 226 and the ram rod 220. Projecting from the bracket 226 in a direction opposite the arm 230 is a further arm 242 which carries a cam follower 244 riding on the cam track of a barrel cam 246 on the main shaft 250. A further arm 248 projects from the bracket 226 and is connected to a spring 250 which serves to bias the cam follower 244 against the track of the cam 246. The provision of the yieldable coupling between the pivoted bracket 226 and the ram rod 220 permits removal of the ram rod from its slide by merely grasping the same and pulling back. Further, in the event of fouling of the ram rod in its guide the machine continues its cycling in that the yieldable connection disrupts drive to the ram rod 220.

The aft motion of the carriage 154 carrying the anvil 152 and the cradle 156 is utilized to selectively release the cradle 156 from the depressed position of Fig. 11. Specifically, and as seen best in Figs. 8 to 11 inclusive, an upstanding catch 252 having a hooked end 252a is secured on the upper side of the bearing 204 beneath a lock pin 254 on the supporting arm 158. The catch 252 is pivotally supported on a pin 256 and is biased into an upstanding position by a spring 258. As seen in Fig. 8, the elevated position of the cradle 156 is determined by a spring 260 connected to the supporting arm 158 and secured to a bracket 262. An adjustable stop screw 264 is carried on the bracket and counteracts the upward biasing effect of the spring 260. Thus, the cradle 156 may be normally disposed in the position of Fig. 8, wherein the cradle cooperates with the anvil 152 to define the seat for successive clips. This relationship of the cradle and the anvil is maintained during fore and aft motion of the carriage 154 except for the beginning of the aft stroke. As the clinching punch 164 begins its effective downward stroke, the forward end of the punch engages the cradle 156 and begins to urge the same gradually downwardly. In response to this downward movement, the pin 254 rides along the outer surface of the hook 252a, camming the catch 252 in the clockwise direction against the biasing effect of the spring 258. After the pin 254 rides over the hooked end, the pin seats itself within the seating notch 252b and holds the cradle 156 in the depressed position of Fig. 11. In this position it is possible to readily free the assembly of the clinched clip and buckle from the anvil support. However, at the beginning of the aft movement of the assembly of the anvil 152 and the cradle 156, the pin 254 frees itself from the retaining slot 252b and the spring 260 restores the cradle 156 to the extended position wherein the same is in condition to receive the next successive clip from the guideway 200.

Figures 13, 14, 15:
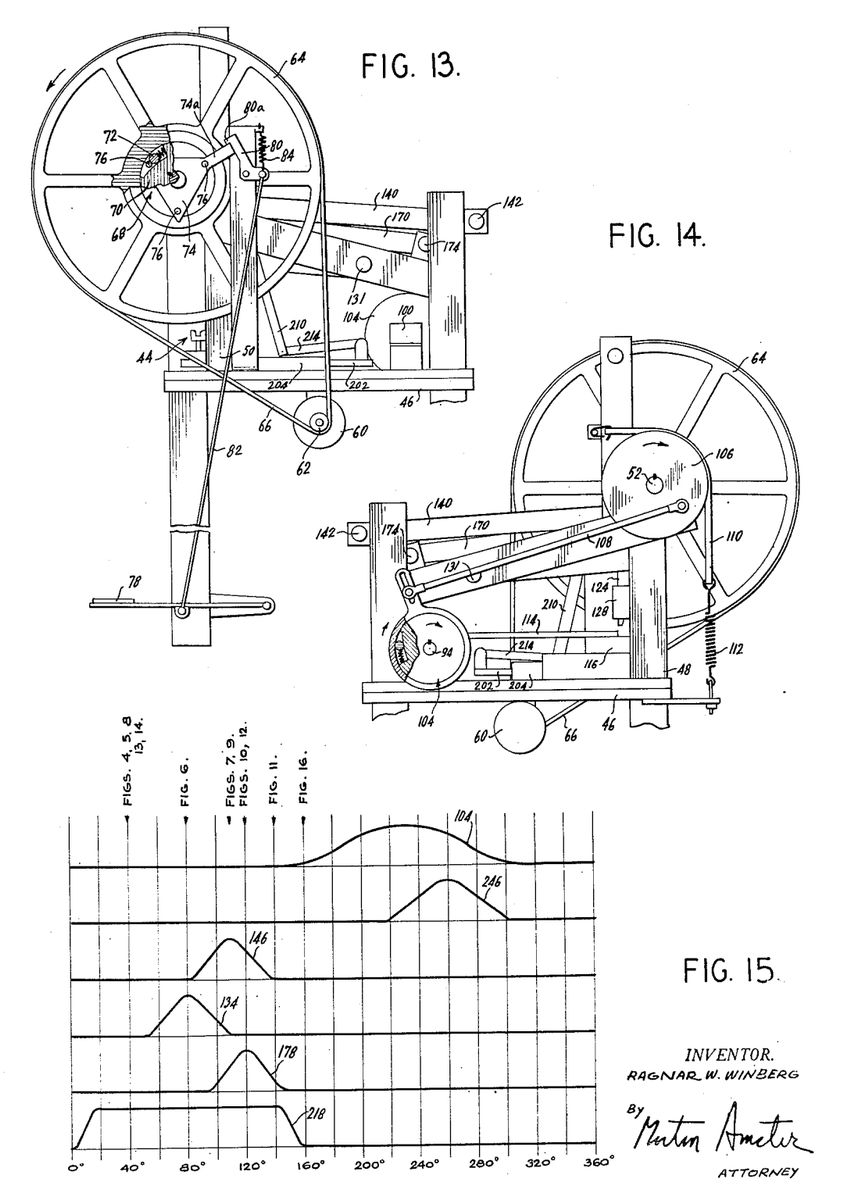
Fig. 13 is an elevational view taken from the right of Fig. 4 and with parts sectioned, showing the details of the single cycle, pedally operated drive for the forming and clinching mechanisms of the present invention.
Fig. 14 is an elevational view taken from the left of Fig. 4 showing the details of the intermittently operable drive for advancing the strip stock to the clip-forming dies.
Fig. 15 is a layout view showing the development for the several cam drives, serving to illustrate the timing of the present mechanisms.

The timing of the various mechanisms at the clip-forming station 42, the clip-clinching station 44 and of the transfer mechanisms will be best appreciated by reference to Fig. 15, which shows the development of the various cams forming the control of the present machine. As a further aid to understanding the drawings, designations have been provided on the layout showing the corresponding position of the elements in the various figures. For example, along the 80° marker is the legend "Fig. 6." Upon inspection of Fig. 6, this will be seen to correspond to the cutting punch 124 in the maximum downward position, that is, with its leading end fully extended into the cutout cavity 118. Specifically referring from top to bottom in Fig. 15, the layout 104 corresponds to the operative period of the feeding mechanisms for advancing the strip material S to the clinching station. Such feeding occurs during a portion of the cycle in which the cutting and shaping operations designated respectively by the layouts 134, 146 have been achieved. The second layout 246 demonstrates that the action of the ram 220 in transferring a completed clasp from the shaping cavity 120 to the guideway 200 occurs in time after both the cutting and forming operations 134, 146 and during the feed of the next successive blank to the cutting and forming station 42. In that the next position of delivery of the sheet stock straddles the shaping die 120, as seen in Fig. 5, such concurrent feeding of the strip and removal of the previously formed clip is compatible. As previously indicated, the third and fourth layouts correspond to the shaping and cutting of the strip, the shaping operation occurring in time after the cutting operation has been completed. It is to be noted, however, that the bending punch 126 begins its downward motion at a time when the cutting punch 124 begins to retract. The fifth layout 178 corresponds to the time at which the clinching operation is achieved by the downward motion of the clinching punch 164. The lowermost layout 218 corresponds to the forward motion of the anvil-cradle assembly, which forward motion occurs at a time other than the transfer of the finished clip to the guideway 200. In this connection, it is seen in Fig. 16 that there are a number of clips in endwise engagement in the guideway, and the transfer of the last formed clip to the channel is effective to urge the foremost clip into the cradle for transfer.

As an aid to a more thorough understanding of the present machine, a description of a typical cycle of operation will be described:

The operator stands at a location forwardly of the machine and manually inserts the partially formed buckle 22 along the path of downward movement of the clinching punch 164, this position being illustrated in Fig. 9. A clip is in position for assembly with the partially completed buckle at the beginning of operation. Thereupon, the operator depresses the foot treadle 78 which imparts drive to the cam shaft 50 for the required single cycle operation. Thereupon, the blank of strip stock S straddling the cutoff cavity, which length was fed to this position during the preceding cycle, is cut off by operation of the punch 124 under control of the cam 134 and bent into the U-shaped configuration by the blade 126a of the punch 126. At approximately the same time, the cam 178 drives the clinching punch downwardly to form the clip about the buckle, as seen in Fig. 11. Immediately following this forming operation, the carriage 154 begins its aft movement, the operator holding on to the partially completed buckle. After the cradle-mandrel assembly is retracted to the aligned position with the channel shown in Fig. 16, the ram 120 is effective to transfer the leading clip to the cradle. During this interval of time, the feeder under control of the silent clutch 104 delivers the next length of material into position relative to the cutting punch. Following the transfer of the leading clip, the cam 218 is effective to restore the anvil-cradle assembly to the forward position illustrated in Fig. 8, whereupon the machine is ready for cycling with the next successive clip in position to be assembled with the partially completed buckle.

Figures 17, 18, 19:
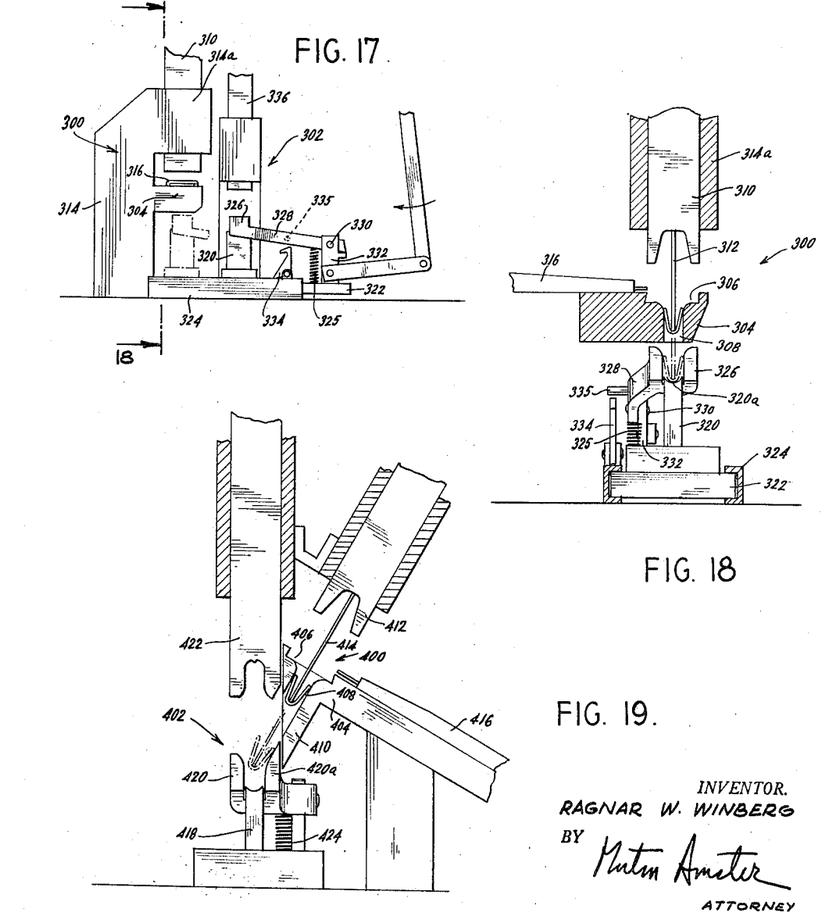
Fig. 17 is a fragmentary front elevational view showing a modified form of the present invention.
Fig. 18 is a sectional view taken substantially along the line 18—18 of Fig. 17 and looking in the direction of the arrows.
Fig. 19 is a fragmentary side elevational view of a further modified form of the present invention.

In Figs. 17 and 18, there is shown a modified form of the present invention. In the interests of simplicity and clarity, the operating mechanisms for the modification will not be described in detail, it being understood that appropriate mechanisms as described in conjunction with Figs. 1 to 15 may be connected to the various operative parts to achieve the desired coordinated drive.

Specifically, as seen in Figs. 17 and 18, a clip-forming station 300 is provided in lateral alignment with a clip-clinching station 302. At the clip-forming station 300, there is provided a female forming and shaping die 304 which is seen in Fig. 18 to include a cutoff cavity 306 and a shaping cavity 308 opening into the floor of the cutout cavity and extending through the female die 304. Disposed above the female die are nested male dies 310, 312, the male die 310 serving as a cutting punch, and the die 312 having a flat blade and serving as a forming punch. The nested assembly of the punches 310, 312, are supported in a bearing 314a of a support 314 provided at the station 300. As previously described, suitable actuating mechanisms are connected to the punches 310, 312 for imparting vertically reciprocating motion through predetermined linear strokes in appropriate timed relation. Strip stock is fed intermittently to advance successive blank forming sections over the cutout cavity 306 through a guide 316, it being noted that the feeder is the same as previously described.

At the clip-clinching station 302, there is provided an upstanding anvil 320 having a clip-supporting surface 320a, and the anvil being supported on a carriage 322 slidable in a transverse guideway 324. The guideway 324 and carriage 322 are arranged such that the anvil and associated cradle 326 may be displaced laterally from a position beneath the forming die 304 of the station 300, as illustrated by the broken lines of Fig. 17, to an operative position in relation to the mechanisms at the clip-clinching station 302. As before, the cradle 326 is mounted for up and down movement from an extended position to a depressed position on a suitable supporting arm 328 which is pivoted at 330 on an upstanding bracket 332 connected to the adjacent end of the carriage or track 322. The cradle 326 is biased into its elevated position by an appropriate spring 325 and is releasably locked in its depressed position in response to downward movement of the associated clinching punch by means of the pivoted and spring biased catch 334 and the pin 335. As before, a clinching punch 336 is provided which may be reciprocated through a predetermined linear stroke by appropriate cam mechanisms, the clinching punch 336 serving to depress the cradle and clinch a clip about the partially completed buckle. Release of the pin 335 from the catch 334 is achieved in response to displacement of the anvil-cradle assembly from the operative position in relation to the punch 336 at the station 302 to the operative position beneath the forming die 304 at the station 300. The timing is selected such that the anvil-cradle assembly is beneath the forming die 304 as the clip is advanced into the shaping cavity 308. The stroke of the blade 312 is selected such that the clip is shaped and transported through the shaping cavity 308 into a position wherein the clip is free to drop into the cradle 326. After such clip-forming operation, the assembly of the anvil and cradle returns to the operative position relative to the clinching die 336, whereupon the clinching operation may be effectuated in the next cycle.

The timing for the mechanism shown in Figs. 17 and 18 for the respective stations 300 and 302, as well as the shifting action, may be best appreciated by again referring to the cam development chart of Fig. 15. In this embodiment the ram rod 220 and associated cam operating mechanisms 246 are eliminated; thus the second layout of Fig. 15 is not needed. It will be seen that the mechanisms for feeding of a strip of material, cutting the strip of material, and shaping the strip of material at the station 300 may be coordinated with cam controls designated generally in Fig. 15 by the numerals 104, 134 and 146. The operation of the clinching punch 336 may be controlled by cam mechanisms broadly equivalent to the cam control 178 while the lateral shift of the anvil-cradle assembly may be achieved by a cam control 218. However, it is to be noted that the shift and return of the anvil-cradle assembly must be achieved before operation of the clinching die. It will be thus appreciated that substantially the same mechanisms as previously described, except for the modifications and changes set forth above, are operative to impart the desired motion to the mechanisms shown in Figs. 17 and 18.

Reference will now be made to Fig. 19, which shows a still further modification of the present invention. In the modification of Fig. 19, the clip-forming station 400 is immediately contiguous to the clip-clinching station 402 and is arranged to drop successive formed clips directly into the supporting cradle. Specifically, at the clip-forming station, there is provided a female die 404 formed with a cutoff cavity 406 which opens downwardly into a shaping cavity or slot 408 which is extended at its under side to provide a slideway 410. As before, a nested punch arrangement including the cutoff punch 412 and the shaping blade or punch 414 is operably disposed in relation to the female die part 404, that is with the lines of action of the respective punches substantially at right angles to the floor of the cutoff cavity 406. A guide 416 delivers the strip stock to a position straddling the cutoff cavity 406, and upon operation of the cutting punch 412 and of the shaping punch or blade 414, a blank is cut off, urged through the shaping cavity or slot 408 and delivered along the inclined guide 410 to the seat provided by the anvil 418 and the depressible cradle 420. It is to be noted that the side of the cradle 420a contiguous to the extension 410 of the guide 404, is formed such that it provides a substantial continuation of the clip delivery path whereby the blade 414 and the aligned surfaces cooperate to guide a formed clip toward the seated position within the cradle. At the station 402 there is disposed a clinching die 422 which is appropriately actuated to initially depress the cradle 420 and thereafter to clinch a clip about the inturned ends of a buckle.

With a clip in position in the cradle, the clinching punch is driven through its forward stroke and then retracted. The length of stock previously advanced into position over the cutoff cavity is then cut off and formed and delivered to the cradle which is restored to the up position. It is to be noted that the cradle need only be depressed for a period sufficient to effectuate removal of the previously formed clip and buckle. To this end a damped return spring 424 has been illustrated beneath the cradle.

Although the various forms of the invention have been described in conjunction with the formation of clips for covered wire buckles, the primary application intended herein, it is to be expressly understood that other uses of the machine are contemplated.

There has been described an excellent but nonetheless illustrative embodiment of the present invention. The range of alternatives, modifications, omissions and additions will be readily apparent to those skilled in the art, and it is accordingly appropriate that the appended claims be afforded a latitude of interpretation consistent with the spirit and scope of the invention.

What is claimed is:

1. In a machine for forming clips from a continuous metal strip and for bending successive clips about an article to be clinched, a clip-forming station including cooperating male and female cutting punches for severing blanks from said metal strip, feed means for intermittently delivering lengths of said metal strip to said cutting punches, forming means cooperating with said cutting punches and movable relative thereto for bending successive blanks into a generally U-shaped configuration, a clip-clinching station including cooperating clinching dies, one of said clinching dies having a clip-supporting surface and the other of said clinching dies being movable relative to said one clinching die, a movable cradle assembled with said one clinching die and cooperating with said clip-supporting surface to initially seat successive clips for the clinching operation, the other of said clinching dies during said relative movement being effective to displace said cradle to a depressed position wherein the assembly of the clinched clip and article may be removed from said clip-clinching station, and means for transferring successive clips from said clip-forming station to said clip-clinching station.

2. In a machine for forming clips from a continuous metal strip and for bending successive clips about an article to be clinched, a clip-forming station including cooperating male and femal forming punches for severing blanks from said metal strip, feed means for intermittently delivering lengths of said metal strip to said forming punches, means cooperating with said female forming punch and movable relative thereto for bending successive blanks into a generally U-shaped configuration, a clip-clinching station including cooperating clinching dies, one of said clinching dies having a clip-supporting surface and the other of said clinching dies being movable relative to said one clinching die, a movable cradle assembled with said one clinching die and cooperating with said clip-supporting surface to initially seat successive clips for the clinching operation, the other of said clinching dies during said relative movement being effective to displace said cradle to a depressed position wherein the assembly of the clinched clip and article may be removed from said clip-clinching station, and means for transferring successive clips from said clip-forming station to said clip-clinching station, the transferring means including a channelway aligned with said female forming punch and extending between said stations, and a ram member periodically operative to displace successive formed clips from said female forming part to said channelway.

3. In a machine for forming clips from a continuous metal strip and for bending successive clips about an article to be clinched, a clip-forming station including cooperating male and female forming punches for severing blanks from said metal strip, feed means for intermittently delivering lengths of said metal strip to said forming punches, a blade cooperating with a cavity in said female forming punch and movable relative thereto for bending successive blanks into generally U-shaped configuration, a clip-clinching station including cooperating clinching dies, one of said clinching dies having a clip-supporting surface and the other of said clinching dies being movable relative to said one clinching die, a movable cradle assembled with said one clinching die and cooperating with said clip-supporting surface to initially seat successive clips for the clinching operation, the other of said clinching dies during said relative movement being effective to displace said cradle to a depressed position wherein the assembly of the clinched clip and article may be removed from said clip-clinching station, a carriage mounting the assembly of said one clinching die and said cradle for movement into and out of an operative position relative to said other clinching die, and means for transferring successive clips from said clip-forming station to said clip-clinching station, the transfer means including a channelway having one end in alignment with said cavity, a ram member periodically driven through said cavity for displacing formed clips into said channelway, and means operable in timed relation to movement of said ram for moving the assembly of said one clinching die and said cradle into alignment with the other end of said channelway.

4. In a machine for forming clips from a continuous metal strip and for clinching successive clips, a clip-forming station including cooperating male and female cutting dies for severing blanks from said metal strip, feed means for intermittently delivering lengths of said metal strip to said cutting dies, blade means cooperating with said female cutting die and movable relative thereto for bending successive blanks into generally U-shaped configuration, a clip-clinching station including cooperating clinching dies, one of said clinching dies having a clip-supporting surface and the other of said clinching dies being movable relative to said one clinching die, a movable cradle assembled with said one clinching die and cooperating with said clip-supporting surface to initially seat successive clips for the clinching operation, the other of said clinching dies during said relative movement being effective to displace said cradle to a depressed position wherein the assembly of the clinched clip and article may be removed from said clip-clinching station, and means for transferring successive clips from said clip-forming station to said clip-clinching station, the transferring means including a carriage mounting the assembly of said one clinching die and said cradle for movement from one limit position beneath said female forming die to another limit position beneath said other clinching die, said assembly receiving successive clips in said one limit upon said movement of said blade means.

5. In a machine for forming clips from a continuous metal strip and for bending successive clips about an article to be clinched, a clip-forming station including cooperating male and female cutting dies for severing blanks from said metal strip, feed means for intermittently delivering lengths of said metal strip to said cutting dies, blade means cooperating with said female forming dies and movable relative thereto for bending successive blanks into generally U-shaped configuration, a clip-clinching station including cooperating clinching dies, one of said clinching dies having a clip-supporting surface and the other of said clinching dies being movable relative to said one clinching die, a movable cradle assembled with said one clinching die and cooperating with said clip-supporting surface to initially seat successive clips for the clinching operation, the other of said clinching dies during said relative movement being effective to displace said cradle to a depressed position wherein the assembly of the clinched clip and article may be removed from said clip-clinching station, and means for transferring successive clips from said clip-forming station to said clip-clinching station, the transferring means including a guideway in communication with said female forming die and extending toward the assembly of said one clinching die and said cradle, the movement of said blade means urging successive clips through said female forming die and into said guideway.

6. In a machine for forming clips from metal blanks and clinching successive clips about the inturned ends of a buckle, a male clinching die having a supporting surface, a movable cradle cooperating with said male clinching die to define a seat for receiving successive clips for assembly with the inturned ends of said buckle, a female clinching die movable relative to said male clinching die and being operative to depress said cradle relative to said male clinching die during a first portion of said movement whereby the clinched assembly of said clip and buckle may be lifted from said supporting surface without interference from said cradle, and means for holding said cradle in a depressed position during at least a portion of the return stroke of said female clinching die.

7. A machine for forming clips from strips of metal and clinching successive clips about the inturned ends of a buckle comprising means having a serrated cutting edge for severing blanks from said strips, means for bending said strip medially to form a U-shaped clip, a male clinching die having a supporting surface, a cradle cooperating with said male clinching die to define a seat for receiving successive clips for assembly with the inturned ends of said buckle, a female clinching die movable relative to said male clinching die whereby the assembly of said clip and buckle may be clinched by action of said female clinching die against said supporting surface, and means for transferring successive U-shaped clips into said seat.

8. In a machine for forming clips from a continuous metal strip and for bending successive clips about an article to be clinched, a clip-forming station including cooperating male and female forming parts for severing blanks from said metal strip, feed means for delivering lengths of said metal strip to said forming parts, means cooperating with said female forming part and movable relative thereto for bending successive blanks into clips, a clip-clinching station including cooperating clinching dies, one of said clinching dies having a clip-supporting surface and the other of said clinching dies being movable relative to said one clinching die, and means for transferring successive clisp from said clip-forming station to said clip-clinching station, the transferring means including a channelway aligned with said female forming part and a ram member periodically operative to displace successive formed clips from said female forming part to said channelway.

9. In a machine for forming clips from a continuous metal strip and for bending successive clips about an article to be clinched, a clip-forming station including cooperating male and female forming parts for severing blanks from said metal strip, feed means for delivering lengths of said metal strip to said forming parts, means cooperating with said female forming part and movable relative thereto for bending successive blanks into clips, a clip-clinching station including cooperating clinching dies arranged forwardly of said forming parts, one of said clinching dies having a clip-supporting surface and the other of said clinching dies being movable relative to said one clinching die, means for transferring successive clips from said clip-forming station to said clip-bending station, the transferring means including a channelway having an entry end aligned with said female forming part and having an exit end extending toward said clinching station and terminating at a location rearwardly of said clinching dies and a ram member periodically operative along said channelway to displace successive formed clips from said female forming die to said channelway, means including a carriage operatively connected to said one clinching die and mounting the same for fore and aft movement between an extended position in cooperating relationship with said other clinching die and a retracted position in alignment with said exit end of said channelway, spring means operatively connected to said carriage and urging said one clinching die into said retracted position, and means operable in timed relation to said transferring means and operatively connected to said carriage for driving same into said extended position.

10. In a machine for forming clips from a continuous metal strip and for bending successive clips about an article to be clinched, a clip-forming station including cooperating male and female forming punches for severing blanks from said metal strip, feed means for intermittently delivering lengths of said metal strip to said forming punch, a blade cooperating with a cavity in said female forming punch and movable relative thereto for bending successive blanks into clips, a clip-clinching station including cooperating clinching dies, one of said clinching dies having a clip-supporting surface and the other of said clinching dies being movable relative to said one clinching die, a carriage mounting said one clinching die for movement into and out of an operative position relative to said other clinching die, means for transferring successive clips from said clip-forming station to said clip-clinching station, the transfer means including a channelway having one end in alignment with said cavity and a ram periodically driven through said cavity for displacing formed clips into said channelway, and means operable in timed relation to movement of said ram for moving the said one clinching die into alignment with the other end of said channelway.

11. In a machine for forming clips from a continuous metal strip and for bending successive clips about an article to be clinched, cooperating male and female forming punches for severing blanks from said metal strip, feed means for delivering lengths of said metal strip to said forming punches, a blade cooperating with a cavity in said female forming punch and movable relative thereto for bending successive blanks into clips, cooperating clinching dies, a carriage mounting one of said clinching dies for movement into and out of an operative position relative to the other of said clinching dies, means for transferring successive clips from said forming punches to said clinching dies, the transfer means including a channelway having one end in alignment with said cavity, and means operable in timed relation to said transfer means for moving said one clinching die into alignment with the other end of said channelway.

12. In a machine for forming clips from a continuous metal strip and for bending successive clips about articles to be clinched and including a clip-forming station and a clip-clinching station, a single-cycle clutching mechanism, a main shaft driven from said single-cycle clutching mechanism, cutting and bending means at said clip-forming station operated from said main shaft, means for delivering said metal strip to said cutting and bending means whereby lengths of said metal strip are cut off and formed into clips upon operation of said cutting and bending means, clinching means at said clip-clinching station operated from said main shaft, and means for advancing successive formed clips from said clip-forming station to said clip-clinching station, the operation of the advancing means being timed in relation to the operation of the clinching means whereby the operator may complete the clinching operation with one clip at a time in the cycle in advance of the delivery of the next clip to the clinching means.

13. In a machine for forming clips from a continuous metal strip and for bending successive clips about articles to be clinched, a clip-forming station and a clip-clinching station, cutting and bending means at said clip-forming station, means for delivering said metal strip to said cutting and bending means whereby lengths of said metal strip are cut off and formed into clips upon operation of said cutting and bending means, clinching means at said clip-clinching station, means for advancing successive formed clips from said clip-forming station to said clip-clinching station, and means for coordinating the operation of the advancing means in relation to the operation of the clinching means whereby the operator may complete the clinching operation with one clip at a time in the cycle in advance of the delivery of the next clip to the clinching means.

14. In a machine for forming clips from a continuous metal strip and for bending successive clips about an article to be clinched, a clip-forming station including cooperating male and female forming punches for severing blanks from said metal strip, feed means for intermittently delivering lengths of said metal strip to said forming dies, a blade cooperating with a cavity in said female forming die and movable relative thereto for bending successive blanks into clips, a clip-clinching station including cooperating clinching dies, one of said clinching dies having a clip-supporting surface and the other of said clinching dies being movable relative to said one clinching die, a carriage mounting said one clinching die for movement into and out of an operative position relative to said other clinching die, means for transferring successive clips from said clip-forming station to said clip-clinching station, said transferring means including said blade, means for periodically driving said blade through said cavity for displacing formed clips therethrough, and means operable in timed relation to movement of said blade for moving said one clinching die into position to receive formed clips from said cavity.

15. A machine for forming clips from a strip of metal and clinching successive clips about the inturned ends of a buckle comprising means having a serrated cutting edge for severing blanks from said strip, means including a moving blade and cooperating forming parts for bending said blank medially to form a U-shaped clip, a male clinching die having a supporting surface, a movable cradle cooperating with said male forming die to define a seat for receiving successive clips for assembly with the inturned ends of said buckle, a female clinching die movable through a predetermined stroke relative to said male clinching die and operative to depress said cradle relative to said male clinching die and to clinch said clip about said inturned ends, said blade being effective to transfer successive U-shaped clips through and beyond said cooperating forming parts and into said seat.

16. In a clip forming and clinching machine, a forming station including nested cutting and bending punches movable along a first line of action, a cutoff cavity along said first line of action bounded by spaced apart edges, a shaping channel in alignment with and opening upwardly into said cutoff cavity, means for delivering lengths of a continuous metal strip into said forming station straddling said cutoff cavity, a clinching station including cooperating male and female die parts, said female die part being constructed to accommodate clips for clinching, first actuating mechanisms operatively connected to said cutting punch for moving said cutting punch through a predetermined stroke for severing said continuous metal strip into a blank and for seating said blank in said cutoff cavity, and second actuating mechanisms operatively connected to said bending punch for moving said bending punch through a predetermined stroke, said bending punch being arranged medially of said shaping channel and being extensible therethrough to displace said blank through said shaping channel and toward said female die part.

References Cited in the file of this patent

UNITED STATES PATENTS

| Re. 9,803 | Heyle | July 12, 1881 |
| 790,186 | Coates | May 16, 1905 |
| 2,260,572 | La Russa | Oct. 28, 1941 |
| 2,530,312 | Nasmith | Nov. 14, 1950 |
| 2,574,380 | Dutelle | Nov. 6, 1951 |